United States Patent
Moyer (10) Patent No.: US 8,200,908 B2
(45) Date of Patent: Jun. 12, 2012

(54) METHOD FOR DEBUGGER INITIATED COHERENCY TRANSACTIONS USING A SHARED COHERENCY MANAGER

(75) Inventor: William C. Moyer, Dripping Springs, TX (US)

(73) Assignee: Freescale Semiconductor, Inc., Austin, TX (US)

(*) Notice: Subject to any disclaimer, the term of this patent is extended or adjusted under 35 U.S.C. 154(b) by 420 days.

(21) Appl. No.: 12/366,994

(22) Filed: Feb. 6, 2009

(65) Prior Publication Data
US 2010/0205378 A1    Aug. 12, 2010

(51) Int. Cl.
G06F 12/00    (2006.01)
(52) U.S. Cl. .......................... 711/141; 711/146
(58) Field of Classification Search .................. 711/141, 711/146
See application file for complete search history.

(56) References Cited

U.S. PATENT DOCUMENTS

| | | | |
|---|---|---|---|
| 5,355,471 A * | 10/1994 | Weight | 714/10 |
| 5,426,765 A | 6/1995 | Stevens et al. | |
| 5,636,363 A | 6/1997 | Bourekas et al. | |
| 5,652,859 A | 7/1997 | Mulla et al. | |
| 5,893,151 A | 4/1999 | Merchant | |
| 5,920,892 A | 7/1999 | Nguyen | |
| 6,029,204 A | 2/2000 | Arimilli et al. | |
| 6,073,212 A | 6/2000 | Hayes et al. | |
| 6,175,930 B1 | 1/2001 | Arimilli et al. | |
| 6,253,291 B1 | 6/2001 | Pong et al. | |
| 6,668,309 B2 | 12/2003 | Bachand et al. | |
| 6,754,856 B2 | 6/2004 | Cofler et al. | |
| 6,907,502 B2 | 6/2005 | Augsburg et al. | |
| 6,925,634 B2 | 8/2005 | Hunter et al. | |
| 6,990,657 B2 | 1/2006 | Hunter et al. | |
| 7,039,901 B2 | 5/2006 | Hunter et al. | |
| 7,096,385 B1 | 8/2006 | Fant et al. | |
| 2002/0100019 A1 * | 7/2002 | Hunter et al. | 717/124 |
| 2003/0005236 A1 | 1/2003 | Arimilli et al. | |
| 2006/0253737 A1 * | 11/2006 | Ueda | 714/25 |
| 2007/0006042 A1 | 1/2007 | Beukema et al. | |
| 2008/0288725 A1 | 11/2008 | Moyer et al. | |
| 2009/0006764 A1 * | 1/2009 | Blumrich et al. | 711/141 |

FOREIGN PATENT DOCUMENTS

WO    9932976    7/1999

OTHER PUBLICATIONS

U.S. Appl. No. 12/201,225, filed Aug. 29, 2008.
U.S. Appl. No. 12/201,228, filed Aug. 29, 2008.
U.S. Appl. No. 12/201,272, filed Aug. 29, 2008.
U.S. Appl. No. 12/201,216, filed Aug. 29, 2008.
U.S. Appl. No. 12/112,796, filed Apr. 30, 2008.
U.S. Appl. No. 11/969,112, filed Jan. 3, 2008.
U.S. Appl. No. 12/053,761, filed Mar. 24, 2008.
Office Action mailed Oct. 31, 2011 in U.S. Appl. No. 12/366,985.

* cited by examiner

*Primary Examiner* — Hashem Farrokh
(74) *Attorney, Agent, or Firm* — Robert L. King; Joanna G. Chiu; Jonathan N. Geld (57) ABSTRACT

A data processing system includes a system interconnect, a first interconnect master coupled to the system interconnect, a second interconnect master coupled to the system interconnect, and a cache coherency manager coupled to the first and second interconnect masters. The first interconnect master includes a cache. The cache coherency manager provides debug cache coherency operations and non-debug cache coherency operations to the first interconnect master. The cache coherency manager generates the debug cache coherency operations in response to debug cache coherency commands from a debugger and generates the non-debug cache coherency operations in response to transactions performed by the second interconnect master on the system interconnect.

18 Claims, 8 Drawing Sheets

METHOD FOR DEBUGGER INITIATED COHERENCY TRANSACTIONS USING A SHARED COHERENCY MANAGER

RELATED APPLICATION

The present invention relates to a co-pending application Ser. No. 12/366,985 entitled "Debug Control For Snoop Operations In A Multiprocessor System and Method Thereof" filed of even date herewith and assigned to the same assignee as the present application.

FIELD OF THE INVENTION

The present invention relates generally to data processing systems, and more particularly to testing the functionality of coherency operations of a cache memory.

BACKGROUND OF THE INVENTION

An IEEE standard known as IEEE ISTO5001, or the Nexus debug standard, is an established real time debug standard that supports real time debug message generation. Debugging is a commonly used term that generally refers to testing of software or electronic circuitry to identify defects or "bugs" for the purpose of identification and reduction of the errors. The Nexus debug standard specifies a mechanism for identifying to an external trace reconstruction tool a predetermined operating condition within the system. Debugging processes are also used in the development of code for a data processing system.

Some data processing systems use multiple processors with closely coupled cache memories. A cache memory stores a subset of duplicative information that is stored in the system memory. Using a cache in the system may reduce the number of occurrences that a processor must communicate with the system memory via a system interconnect. However, the presence of various caches (or other memory devices) in a system can readily permit a data operand which has the same identifier or address to be present at various locations in the system. When the data operand is modified in one part of the system, an opportunity exists that an old version of the data operand will be stored or used. Memory coherency refers to the need of each processor in a multiple master data processing system to have access to the most recently modified data corresponding to a particular address in the memory system. The presence of differing data values for a same address value in a data processing system may lead to system errors.

To maintain memory coherency, reads and writes of information to the system memory are monitored or "snooped". When either a memory read or a memory write of data at an address is detected, this address of the transaction is used as a snoop address. A snoop request is initiated and directed to one or more caches in the system such that snoop lookups can be performed to search for any address in the caches that match the snoop address. A snoop hit occurs for every match, and any needed corrective action is taken to maintain coherency of the data at the address in the cache where the snoop hit occurs.

For a processor cache with a single set of tags, arbitration is needed between processor requests to search for addresses in its own cache (such as for performing a load or store instruction whose corresponding access address may be contained in the cache) and snoop requests to perform snoop lookups in the cache. In one arbitration solution used today, any pending snoop request blocks the processor from accessing its cache for one or more cycles. If snoop lookups occur frequently, then processor performance may be negatively impacted.

The debugging of a multiple core data processing system is a difficult and time consuming operation. Numerous aspects of the internal operation remain hidden from the debugger. The amount of parallel processing in such systems, along with the relatively non-predictable behavior of multi-core systems make debugging difficult, particularly with respect to shared memory and other shared resources. Arbitration, collisions for shared resources, cache conflicts and coherency transactions cause system behavior to appear non-deterministic to a user. Therefore assistance in debugging system scenarios that involve cache coherency operations is needed.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Figure 1:
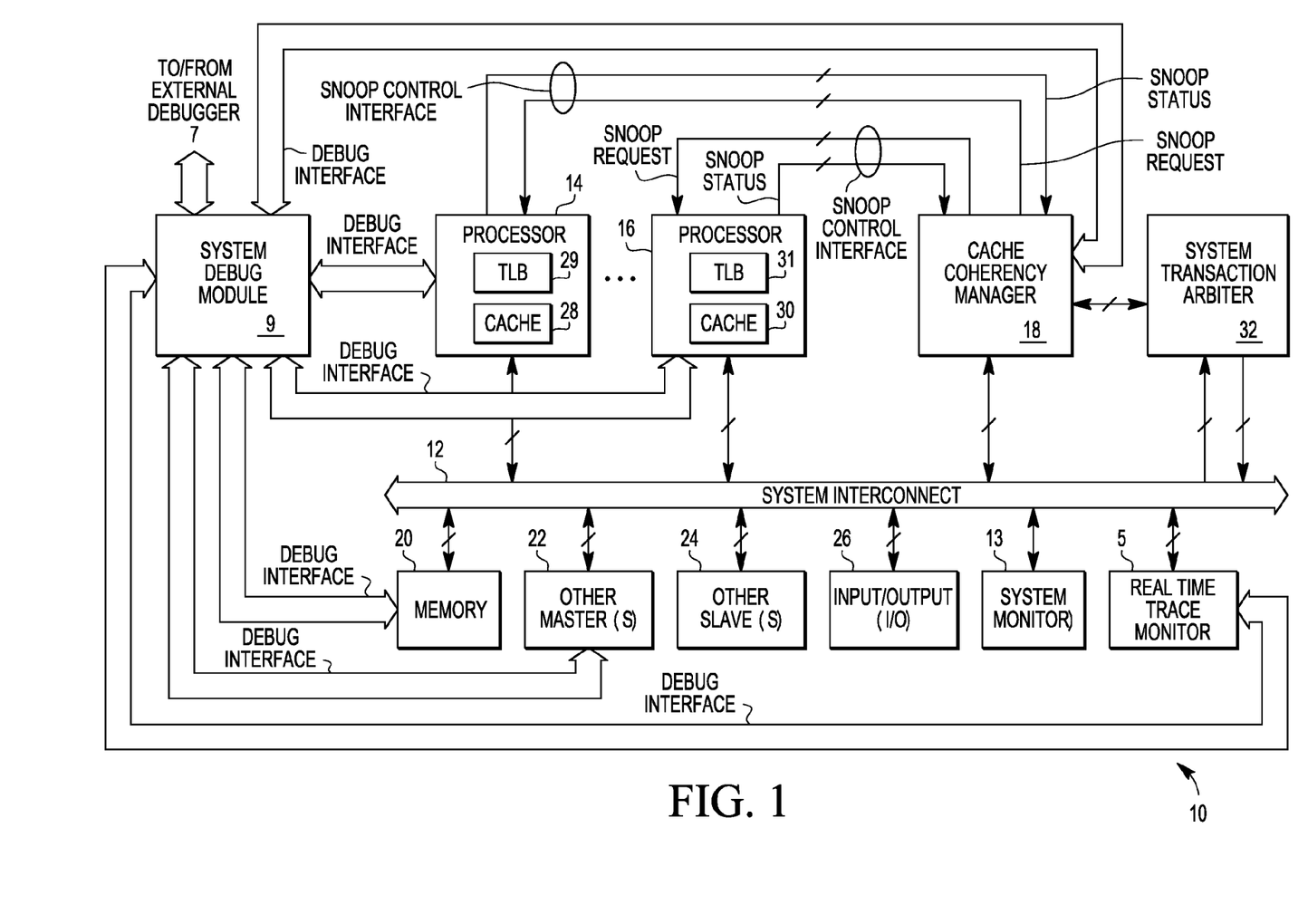
FIG. 1 illustrates a block diagram of a data processing system in accordance with an embodiment of the present invention.

FIG. 1 illustrates, in block diagram form, an example of a data processing system 10 with debug control for initiating cache coherency transactions using a cache coherency manager that is shared between an external debugger and the data processing system. Data processing system 10 has an interface for an external debugger 7 (illustrated in FIG. 2), which is user programmable and implements programmed operations designed to observe and analyze the data processing system 10. The external debugger 7 can insert memory operations or transactions into a snoop queue of a processor or into a cache coherency manager 18 via communications with system debug module 9 without requiring a global transaction on the system bus or interconnect. Additionally, the processor does not have to be placed into a special mode of operation to permit the external debugger to directly insert cache command operations into a snoop queue of a processor. System-wide snoop command operations may also be requested of cache coherency manager 18 by the external debugger 7 without use of the system interconnect 12 bandwidth to supply the commands. The ability to implement system-wide snoop command operations without requiring the system interconnect 12 bandwidth permits efficient debug operation and can be considered to improve bandwidth performance of data processing system 10. Examples of such cache command operations to be described below include, for example only, a read, a read with the intent to modify, a read with no intent to cache, a write, a write with flush, a flush (i.e. read and put the data on the system interconnect) and an invalidate. Data processing system 10 of FIG. 1 is a multiprocessor system and includes a system debug module 9, a processor 14, a processor 16, a cache coherency manager 18, a system transaction arbiter 32, a system memory 20, other master devices 22, other slave devices 24, input/output (I/O) devices 26, a system monitor 13, and a real time trace monitor 5. The system debug module 9 of FIG. 1 interfaces with each of processor 14, processor 16, cache coherency manager 18, system memory 20, the other master devices 22 and the real time trace monitor 5 via respective debug interfaces. The system debug module 9 also interfaces to external debugger 7 of FIG. 2 through another interface. The external debugger 7 is typically implemented as circuitry that is off-chip or external to a semiconductor die. However, in some embodiments, a portion of all of the external debugger 7 may be implemented on-chip or on the same semiconductor die. The external debugger 7 is coupled to test or debug terminals of the system debug module 9. The system debug module 9 has additional test or debug terminals coupled to test terminals of the processor 14, the processor 16, the cache coherency manager 18, the system memory 20, the other master devices 22 and the real time trace monitor 5 via the respective debug interfaces. The real time trace monitor 5 functions to monitor and/or trace processing activity as seen on the system interconnect 12, as well as monitoring other events within data processing system 10, such as events within the various modules of data processing system 10 by other interfaces (not shown) and provides information useful for analyzing the operation of data processing system 10.

The devices shown in FIG. 1 are communicatively coupled to a system interconnect 12 but may be coupled by other types of system interconnects in other embodiments. For example, the devices shown may be communicatively coupled by a system interconnect that includes a cross bar switch or other type of switch, or a system interconnect that includes multiple busses and/or switches. In one embodiment, a system interconnect may include multiple signal lines for address, data, and control information. In yet another form the system interconnect may be an optical interconnect or a wireless interconnect.

System transaction arbiter 32 arbitrates among various masters of system 10 for transactions on a system interconnect 12. I/O devices 26 may be any number of I/O devices such as keyboard controllers and communications ports. Other slave(s) 24 may include memory devices such as a system cache (e.g. L2 cache). Both other slave(s) 24 and I/O devices 26 may be accessible by transactions on system interconnect 12 that are generated by the master devices of the system (e.g. processor 14, processor 16, or other master devices 22). In one embodiment, other master(s) 22 include other types of processors (e.g. a digital signal processor) or a direct memory access (DMA) device which can generate transactions on system interconnect 12. In one embodiment, each master device of the other master(s) 22 may also include a cache (not shown).

System 10 includes a cache coherency manager 18 that snoops system interconnect 12 for transactions and initiates snoop requests for various caches of system 10 (e.g. cache 28, cache 30) for the transactions in order to maintain cache coherency. In one embodiment, if a cache contains a copy of a data operand, then that cache will invalidate the corresponding cache entry in response to the snoop request. In alternate embodiments, the cache containing a copy of the data operand may supply the most recent version of the data to the cache coherency manager 18 or to other caches or memory in data processing system 10 in order to maintain coherency. Any of a variety of coherency protocols may be used in various embodiments.

One example of a transaction is a write transaction by processor 16 to system memory 20 for writing data to a location in system memory 20. In response to the transaction, cache coherency manager 18 would generate a snoop request to the other caches (e.g. cache 28) to search for data of the same memory address. If a cache has an entry corresponding to the same memory address, then in one embodiment the cache would invalidate that data since an updated version is being provided to system memory 20 on system interconnect 12.

In the embodiment shown, system 10 includes a snoop control interface between the cache coherency manager 18 and each of the processors 14 and 16 for exchanging information regarding snooping operations. In the embodiment shown, the snoop control interface includes snoop request lines and snoop status. Alternate embodiments may include more or different lines within the snoop control interface. These lines will be discussed below. In the embodiment shown, cache coherency manager 18 only includes snoop control interfaces with processors 14 and 16. However, in other embodiments, cache coherency manager 18 may include a snoop control interface with other devices having a cache (e.g. other master devices 22, other slave devices 24, and other caches). In alternative embodiments, processors 14 and 16 may include additional caches.

In the illustrated embodiment, system 10 also includes a system monitor 13. System monitor 13 may be, for example, a performance monitor or a global throughput monitor. Any known performance monitor or global throughput monitor may be used, where information from system monitor 13 can be used, for example, by one or more masters on the system interconnect 12 to alter one or more parameters. Additional details of system monitor 13 will be discussed below.

Figure 2:
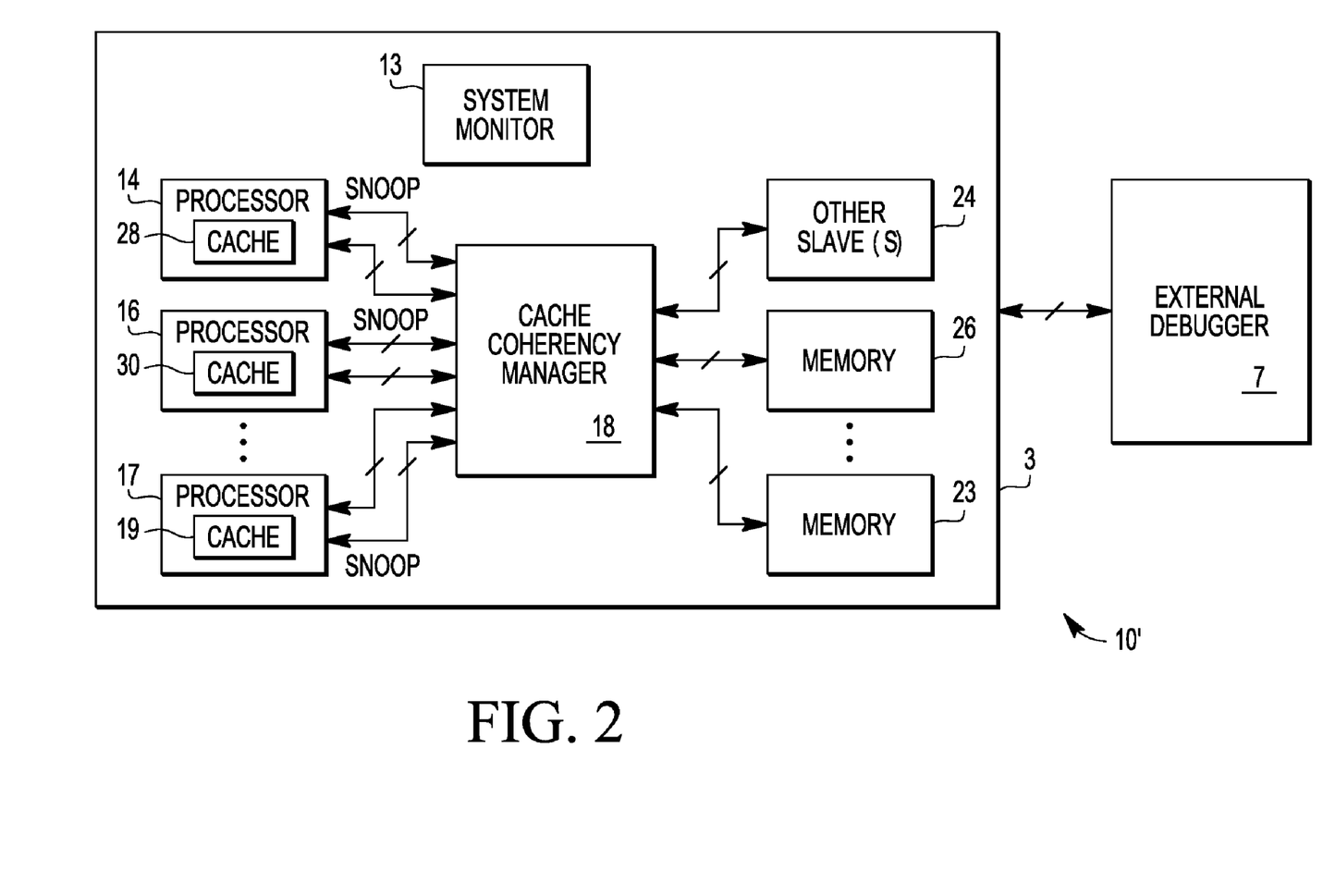
FIG. 2 illustrates a block diagram of a data processing system in accordance with another embodiment of the present invention.

System 10 also includes the external debugger 7 which is a debugger that is preferably external to one or more integrated circuits containing a portion of the illustrated data processing system 10. The external debugger 7 interfaces with processor 14, processor 16, system memory 20 and the other master(s) 22 via the system debug module 9 and respective debug interfaces. External debugger 7 has the ability to insert coherency operations into a snoop queue of any of processor 14, processor 16 and/or the other master(s) 22 by communicating with system debug module 9 and without requiring a transaction on the system interconnect 12. The external debugger 7 operates without placing any of the processor 14, processor 16 or other master(s) 22 in a special operating mode and thus functions real time. Specifically, external debugger 7 is able to insert a cache command operation into a snoop queue of any of processor 14, processor 16, and the other master(s) 22 by performing one or more operation requests to system debug module 9, which then communicates with the appropriate cache or coherency manager within data processing system 10 to complete the requested operation. Additionally, the external debugger 7 is able to initiate a snoop transaction inside the cache coherency manager 18 for use by the external debugger 7. The cache coherency manager 18 contains additional registers to be described below which are mapped into the debugger interface register set. These external debugger-controlled registers are used to inject snoop transactions in the form of debug cache coherency operations into the data processing system 10. Response and/or data may be collected for presentation to the external debugger 7 in a set of snoop status registers described below. Because the logic circuitry required to implement the cache coherency operations initiated by the external debugger 7 is internal to the cache coherency manager 18, there is no requirement for an additional master port and associated interface, control and buffering complexity. The logic circuitry within cache coherency manager 18 for performing such requests does not need the full functionality of a master device within the data processing system 10 and thus has asymmetric capability as compared with the processors 14 and 16 which cache coherency manager 18 communicates with.

In other embodiments, other types of data systems may include different configurations and/or have additional circuitry. Also, other embodiments may not have all of the circuitry shown in FIG. 1. In one embodiment, some or all of the circuitry shown in FIG. 1 may be implemented on one integrated circuit. However, in other embodiments, system 10 may be implemented with multiple integrated circuits. In one embodiment, system 10 may be implemented as part of an information system such as e.g. a computer, cell phone, PDA, electronic control circuitry of an automobile, or other type of system implementing a data processing system.

Illustrated in FIG. 2 is another embodiment of a data processing system configuration in accordance with the present invention. For convenience of illustration, elements in FIG. 2 which are common to those in data processing system 10 of FIG. 1 are numbered the same. Data processing system 10' of FIG. 2 has an architecture wherein the cache coherency manager 18 is central or functions as a common communication point for the processing system rather than the system interconnect 12 of data processing system 10. In data processing system 10' the cache coherency manager 18 is coupled to a plurality of processors, such as processor 14 having the cache 28, a processor 16 having the cache 30, and a processor 17 having a cache 19. Each processor is coupled to the cache coherency manager 18 via a bidirectional snoop control interface generally labeled "Snoop" for communicating snoop requests and snoop status information. Additionally, each processor has a bidirectional multiple conductor connection for the communication of address, data and control information. The cache coherency manager 18 is also coupled via bidirectional multiple conductors to other slave device(s) 24 and to various memories, such as a memory 23 and a memory 27. Within data processing system 10' is the system monitor 13 which performs the same function as described above in connection with data processing system 10. These system components are implemented on a single integrated circuit 3 which has a test or debug interface which is coupled to the external debugger 7.

In operation, data processing system 10' is a system having a cache coherency manager 18 in a multiple master cache coherent data processing system. Cache coherency is also implemented with debugger-controlled logic that is addressable by the external debugger 7 through the test or debug interface. In one form the debugger-controlled logic is a plurality of JTAG (Joint Test Action Group) data registers. Therefore, the external debugger 7 can initiate a set of cache coherency operations which utilize only the resources within the cache coherency manager 18. The logic required to implement this functionality is located internal to the coherency manager 18 and therefore no additional master ports and associated interface control are required other than the interface directly between the cache coherency manager 18 and the external debugger 7. Further details of cache coherency manager 18 in FIG. 4 will more illustrate the functionality between external debugger 7 and cache coherency manager 18.

Figure 3:
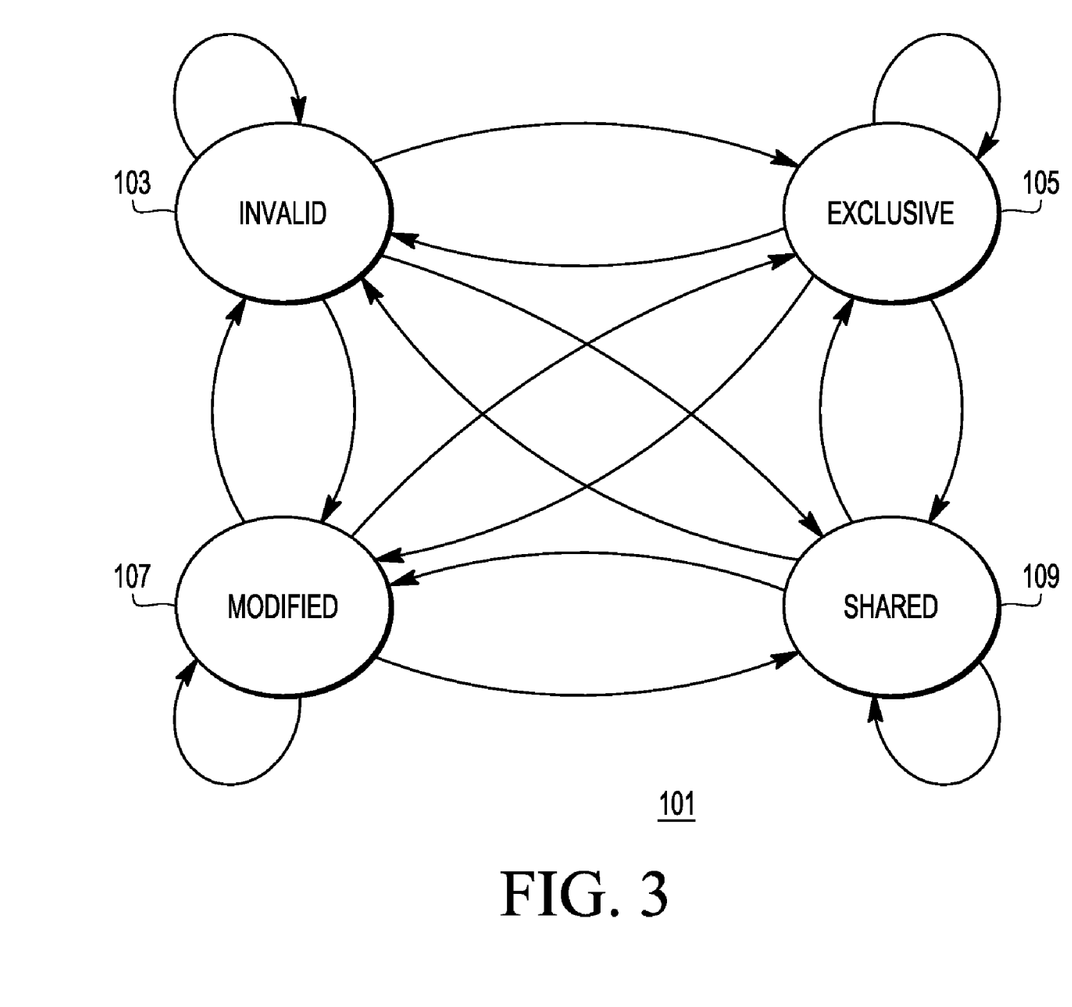
FIG. 3 illustrates a state diagram of the four states of a memory coherence protocol known as the MESI (Modified, Exclusive, Shared, Invalid) protocol.

Illustrated in FIG. 3 is a state diagram 101 of a cache coherency and memory coherence protocol known as the MESI protocol and named using a first letter of each of four possible states for each cache line in a cache. The MESI protocol is an exemplary cache protocol, among others, that may be implemented in each of the various embodiments for data processing systems described herein. The MESI protocol has a Modified state 107, an Exclusive state 105, a Shared state 109 and an Invalid state 103. Every cache line of every cache within data processing system 10 or 10' follows this protocol and therefore at any point in time assumes one of these four states. A cache may satisfy a read request from any state except the Invalid state 103. Data associated with an Invalid line in a cache must be fetched from elsewhere to satisfy a read request. A write may only be performed if a cache line is in the Modified state 107 or the Exclusive state 105. If an addressed cache line is in the Shared state 109, all other cached copies must be invalidated first. This function is typically done by a broadcast operation known as a Read for Ownership (RFO). The state diagram of FIG. 3 illustrates that any of the four states may transition to any of the other states or may remain in the same state after a cache line operation occurs. A cache may discard a non-modified line at any time and change to the Invalid state 103. A cache line that is in the Modified state 107 must be written back to a system memory first. A cache that holds a line in the Modified state 107 must snoop or intercept all attempted read from all other caches in the system of the corresponding main memory location and insert the data that the cache holds in that line. A cache that holds a line in the Shared state 109 must detect the sending of invalidate or RFO broadcasts from other caches and move the line to the Invalid state 103 on a match. The Modified state 107 and Exclusive state 105 are always precise which means that they match the true cache line ownership situation in the system. The Shared state 109 may be imprecise which means that if a second cache discards a shared line, the first cache may become the sole owner of that cache line. The first cache however will not be changed to the Exclusive state 105 because other caches generally do not broadcast notices when they discard a cache line. The reason for this functionality is that the first cache could not use such notices without incurring additional control logic including logic circuitry for maintaining a count of the number of shared copies. Therefore, the Exclusive state may be considered an opportunistic optimization. If the processor wants to modify a cache line that is in the Shared state, a bus transaction is necessary to invalidate all other cached copies. The Exclusive state enables modifying a cache line without requiring a bus transaction. Various modifications of the MESI protocol are well known in the art, and may be utilized in conjunction with the present invention. Other cache coherency protocols may be utilized in conjunction with the present invention as well.

Figure 4:
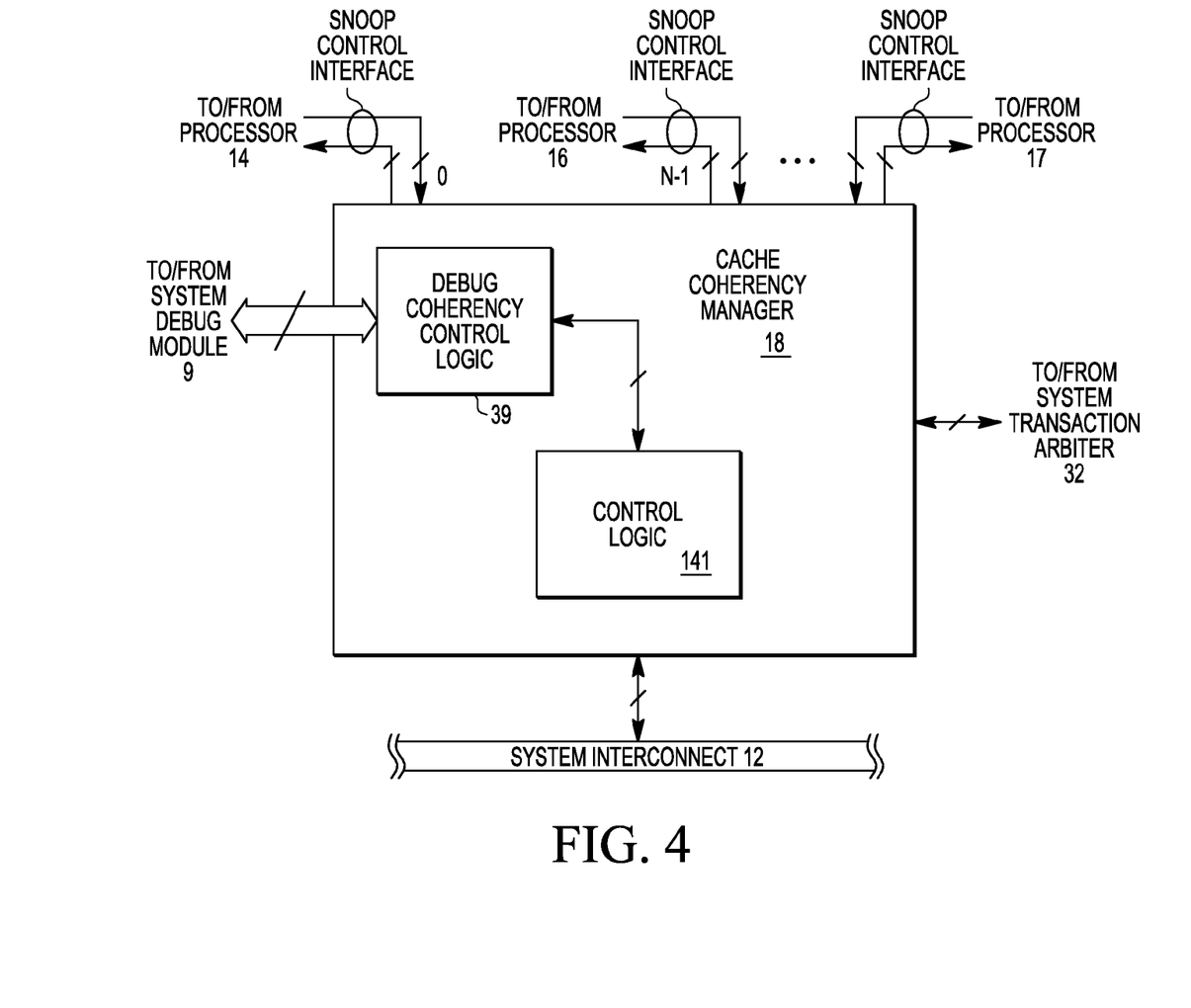
FIG. 4 illustrates a block diagram of the cache coherency manager as used in the embodiment of FIG. 1 and in accordance with one embodiment of the present invention.

Illustrated in FIG. 4 is a block diagram of a portion of the cache coherency manager 18. Assume for ease of explanation that cache coherency manager is implemented within data processing system 10 of FIG. 1. Therefore, the cache coherency manager 18 has a communication port that is coupled to the system interconnect 12. Additionally shown in FIG. 4 is the coupling of the snoop control interface to and from each of processor 14 and processor 16. Analogous coupling to additional processors may be implemented as indicated by the multiple dots between the snoop control interfaces for processor 14 and processor 16. The cache coherency manager 18 also has a bidirectional data port coupled to the system transaction arbiter 32 of FIG. 1. Within the cache coherency manager 18 is control logic 141 which implements a variety of debug coherency functionality as well as non-debug coherency functionality. A debug coherency control logic 39 is coupled to the system debug module 9 via a bidirectional, multiple conductor data port. The debug coherency control logic 39 is also coupled to the control logic 141 via a bidirectional, multiple conductor interconnect or bus.

In operation, the cache coherency manager implements most of the external debugger cache coherency functionality with circuitry of the debug coherency control logic 39. Cache coherency manager 18 is coupled to the various processors and other master devices via the system interconnect 12, as well as through snoop control interfaces 0 to N−1. Assume that during a period of time of operation that cache coherency manager 18 provides debug cache coherency operations and non-debug cache coherency operations to the processor 14 which functions as an interconnect master. During a first portion of the period of time the cache coherency manager 18 generates the debug cache coherency operations in response to debug cache coherency commands from the external debugger 7. The information associated with the debug cache coherency operations, in one form, is provided to processor 14 of data processing system 10. In one form, in response to processing a cache coherency operation whose corresponding access address hits a cache line in a cache such as cache 28 of processor 14, the cache coherency manager 18 under control of the control logic 141 provides a cache coherency response to external debugger 7 via the system debug module 9 which includes a previous coherency state of the cache line that was identified as the cache hit. In another form, the previous coherency state of the cache line is transitioned to a new coherency state in response to processing of the debug cache coherency command.

During a second portion of the period of time the cache coherency manager 18 generates non-debug cache coherency operations in response to transactions performed by processor 16 of data processing system. The information associated with the non-debug cache coherency operations are also provided to the processor 14. The debug cache coherency commands from the external debugger 7 are provided via the system debug module 9. It should be noted that the debug cache coherency operations are generated in response to the debug cache coherency commands without placing a significant portion of the data processing system in a halted mode. In particular, the processors, such as processors 14-16, other master(s) 22, other slave(s) 24 and system memory 20 are allowed to continue processing and are not halted when the cache coherency manager 18 is processing in response to the debug cache coherency commands. This increased functionality significantly improves the efficiency and performance of the data processing system. For additional understanding of the functionality of the cache coherency manager 18 when processing external cache coherency debug commands, further detail of the debug coherency control logic 39 will be provided.

Figure 5:
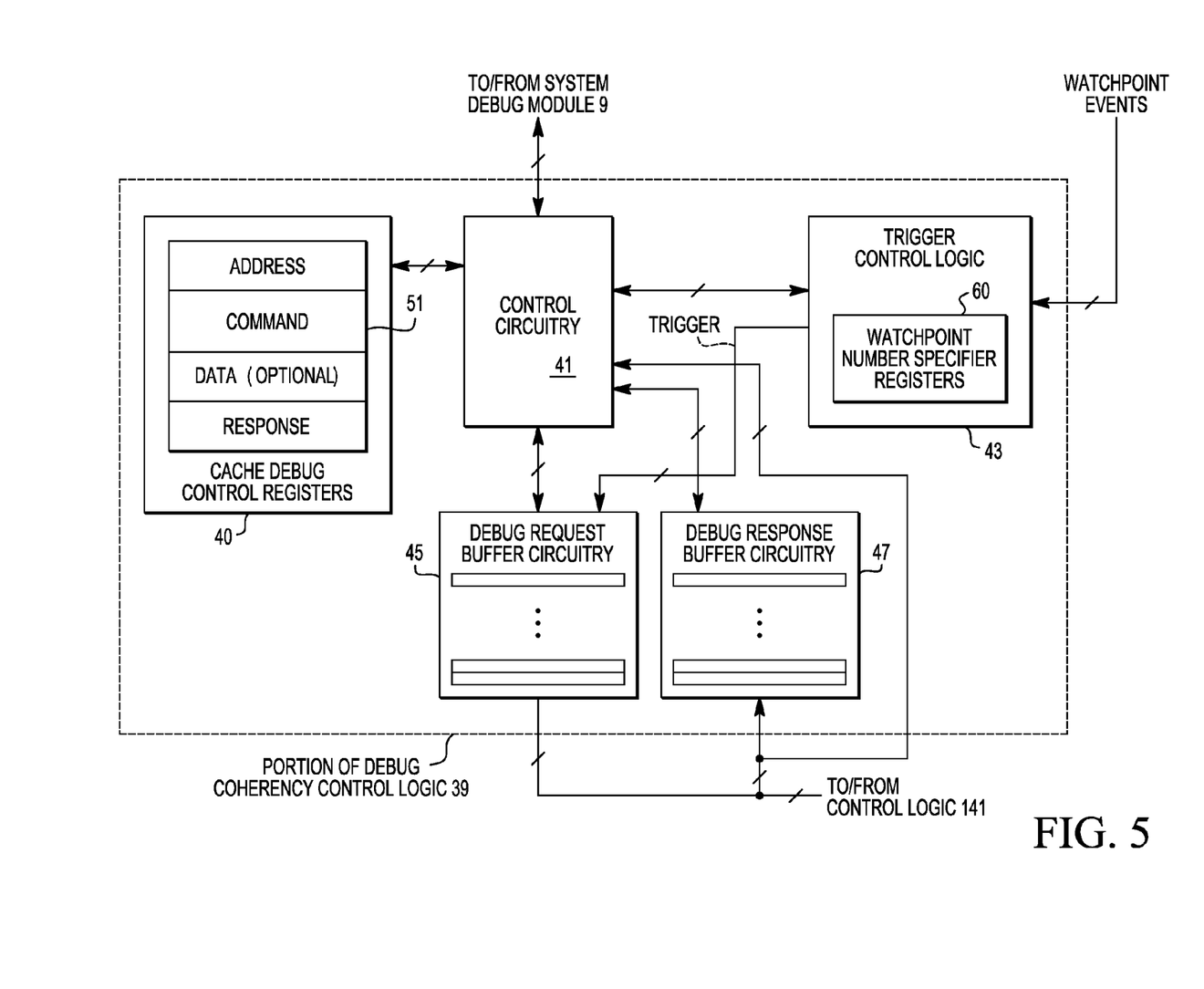
FIG. 5 illustrates in block diagram form an example of one form of debug coherency control logic of the cache coherency manager of FIG. 4 and in accordance with one embodiment of the present invention.

Illustrated in FIG. 5 is a portion of the debug coherency control logic 39 that further illustrates the functionality of the processing of debug commands. Control circuitry 41 interfaces directly with the system debug module 9, cache debug control registers 40, trigger control logic 43, debug request buffer circuitry 45 and debug response buffer circuitry 47 via bidirectional multiple conductors. The cache debug control registers 40 are a plurality of storage devices such as registers that hold address information, a command 51, data (optional) and a response. This information is provided for each debug snoop command. The debug request buffer circuitry 45 has a plurality of storage registers for holding debug snoop requests generated by the external debugger 7 by accesses to the cache debug control registers 40. An output of the debug request buffer circuitry 45 is a debug snoop request signal. The debug request buffer circuitry 45 has an input/output terminal coupled to and from the control logic 141. The debug response buffer circuitry 47 has a plurality of storage registers for holding debug snoop status information associated with each processed debug snoop request. The trigger control logic 43 has one or more watchpoint number specifier registers 60 and has an input for receiving a plurality of watchpoint events. The trigger control logic 43 has an output coupled to the debug request buffer circuitry 45 for providing a Trigger signal.

In operation, the debug coherency control logic 39 interprets debug commands from the external debugger 7 and reads and writes the cache debug control registers 40 subject to the type of operation provided by the external debugger 7. The external debugger 7 provides to the system debug module 9 commands to initiate the debug snoop requests by providing a snoop address, a snoop command/transaction type, and a snoop ID value for processing. The control logic 141 provides this information to the cache debug control registers 40 by writing the respective cache debug control register within cache debug control registers 40. The stored information is used to create a debug snoop request which is placed in debug request buffer circuitry 45 by control circuitry 41. Processing of stored commands in the debug request buffer circuitry 45 to generate debug snoop requests to the control logic 141 is subject to selective delay by the trigger control logic 43 in one embodiment. When a command from the external debugger 7 indicates a cache coherency operation request, debug coherency control logic 39 causes the cache debug control registers 40 to be updated with the relevant information needed for processing the cache coherency operation. The address and command and transaction type information of the cache debug control registers 40 is coupled via the control circuitry 41 into the debug request buffer circuitry 45 for subsequent provision to the control logic 141. When debug cache coherency commands requests are received, they are stored in the debug request buffer circuitry 45. After processing of each debug cache coherency command by cache coherency manager 18, the resulting debug snoop status signals are received and stored in the debug response buffer circuitry 47. The debug response buffer circuitry 47 enables the external debugger 7 to be decoupled from the internal cache coherency operations by buffering cache coherency command responses for subsequent retrieval by the external debugger 7 via the cache debug control registers 40. External debugger 7 typically operates at a much slower rate than the internal circuitry of any of processor 14 through processor 16 or data processing system 10. Thus a buffering mechanism is typically used to ensure that all responses are made available to the external debugger 7. The debug snoop status signals are stored in the debug response buffer circuitry 47 as debug cache coherency and cache snoop operations are acknowledged by the control logic 141 to the debug coherency control logic 39. The debug response buffer circuitry 47 queues responses as they are received, and the entry at the head of the debug response buffer circuitry 47 is coupled for storage in the data and response fields of the cache debug control registers 40 for subsequent retrieval by the external debugger 7 via commands provided to the control circuitry 41 from the system debug module 9. As the external debugger 7 retrieves information on a processed debug cache coherency command by reading the Response register of the cache debug control registers 40, the next valid entry from the head of the debug response buffer queue is placed into the response register in a FIFO manner. The response in the form of a debug status indicates that the debug cache coherency command requested by the external debugger 7 was performed. Debugger-initiated snoop and cache coherency operations do not broadcast back to the data processing system 10 and thus are minimally intrusive into the data processing system 10. In some embodiments, it may be desirable to control the point in time that a snoop request from the external debugger 7 is presented to the control logic 141 for processing. That is, it may be useful to preload one or more debug snoop requests from the external debugger 7 into the debug request buffer circuitry 45 and have a system or processor event control the actual generation of a debug snoop or cache coherency request, particularly since the external debugger 7 and the debug interface from external debugger 7 may be operating significantly slower than the remainder of data processing system 10, in many cases thousand to tens of thousands of times slower. The trigger control logic 43 functions to synchronize initiation of either entering a debug command into the snoop queue from debug request buffer circuitry 45, and/or may also provide the function of forcing a debug command from the head of the snoop queue based on one or more processor events such as a watchpoint event that is monitored in the data processing system 10. Specifically, the trigger control logic 43 may be configured to wait for a specific trigger event to cause one or more transactions stored in debug request buffer circuitry 45 associated with a previously received debug command from the external debugger 7 to be loaded into the snoop queue. In this implementation the trigger signal is generated and provided to the debug request buffer circuitry 45 for causing one or more stored entries in debug request buffer circuitry 45 to be sent to the control logic 141 for processing. Alternately, the trigger control logic 43 may be configured to wait for a specific trigger event to be detected and then to cause an already buffered debug snoop request at the head of the snoop queue to be processed. This allows for further control over the synchronization of a debug snoop request to processor 14 activity in order to control the boundary at which the snoop request is processed, allowing a real time request to be simulated by the external debugger 7. In this alternate implementation a trigger signal is generated by the trigger control logic 43 and provided to the control circuitry 41 which in response provides the debug snoop request at the head of the buffer queue of debug request buffer circuitry 45 for processing. This alternate implementation allows for the control circuitry 41 to cause the request at the head of the debug request snoop queue to be processed regardless of the fullness of the snoop queue. The trigger control logic 43 may range in complexity from an address and associated command or specifier comparison which is indicated by assertion of one or more watchpoint event signals in response to the occurrence of a predetermined watchpoint condition to a sequence driven state machine that uses debug resources such as watchpoints in more complex ways. In one embodiment, the registers of the cache debug control registers 40 are JTAG (Joint Test Action Group)— data registers and are used to implement cache debug snoop operations using JTAG commands from the external debugger 7. The response register of the cache debug control registers 40 provides the output of snoop lookups and debug cache coherency commands back to the external debugger 7 as the snoops and commands are processed and the responses are retrieved by the external debugger 7 from the system debug module 9 via the response register. Alternate implementations may use any desired form of communication of the commands and responses between external debugger 7 and the debug coherency control logic 39.

Figure 6:
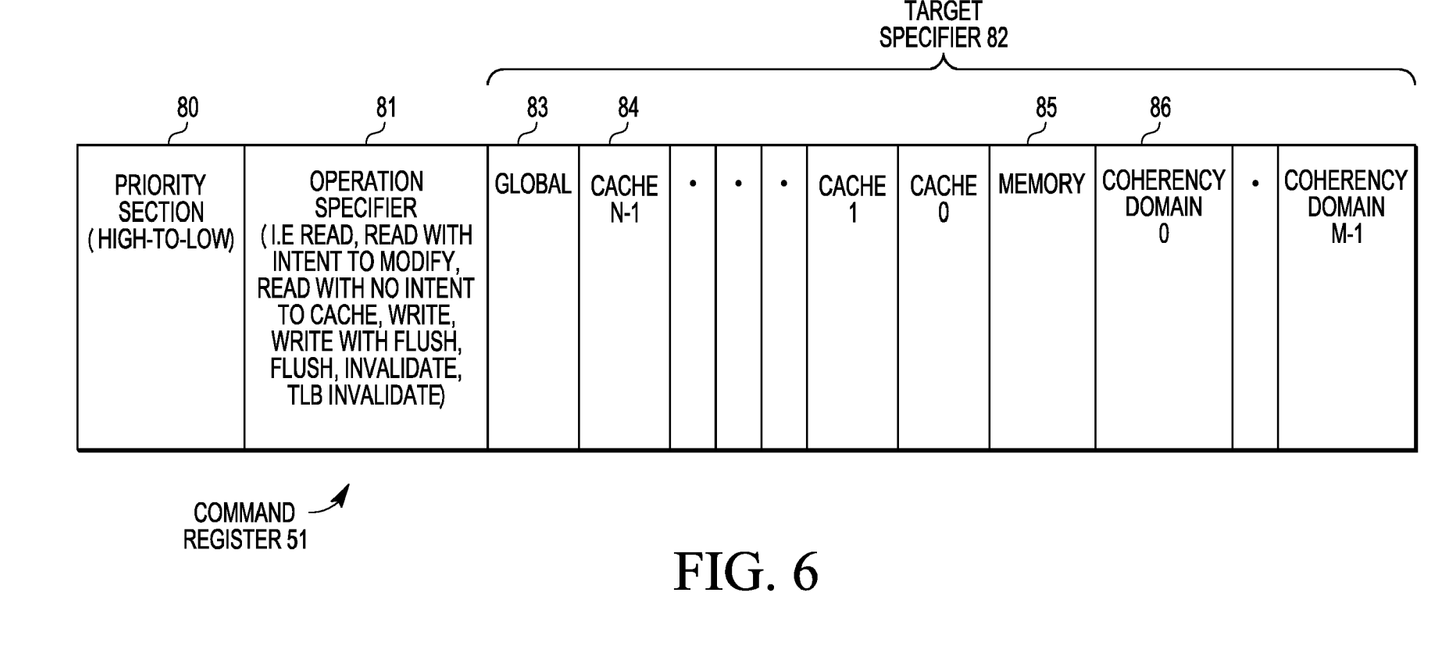
FIG. 6 illustrates in diagrammatic form an example of a command register within a plurality of cache debug control registers of the debug coherency control logic of FIG. 5 and in accordance with one form of the present invention.

Illustrated in FIG. 6 is an exemplary format of the command register in the cache debug control registers 40 of FIG. 5. It should be understood that the illustrated fields of the command register may be organized in any order and that other fields may also be included. A field 80 is a priority section that prioritizes the command with a value that can vary from a high priority to a low priority command. Field 80 thus implements the ability to prioritize one cache coherency command (debug or non-debug) over another. A field 81 is an operation specifier that details the type of operation of the debug coherency command. By way of example only, some of the cache coherency operations that may be specified are a cache line read operation, a cache line read with an intent to modify, a cache line read with no intent to cache, a cache line write, a cache line write with flush where a flush is to put the information on the system interconnect 12, a cache line flush, a cache line invalidate, and a translation lookaside buffer (TLB) entry invalidate. Each of these command operations generally (but is not required to) corresponds to an analogous non-debug cache coherency operation which can be generated or created by cache coherency manager 18 in response to one of various transaction types generated by an interconnect master of data processing system 10. The priority field 80 and operation specifier field 81 are followed by a target specifier 82 having a plurality of fields. A global field 83, when set or asserted, indicates a global target of all caches. A number of fields each identify a specific one of N total caches in the data processing system 10. For example, field 84 identifies the specific cache (N-1). A memory field, when set or asserted, indicates the system memory 20 of data processing system 10 is a target of the operation. Thus the external debugger 7 may specify one or more specific target caches in the system for inclusion in a snoop operation. The remaining illustrated fields of the target specifier 82 are optional and identify specific coherency domains. These fields permit the external debugger 7 to have the capability of defining "spheres" or layers of memory coherency and thereby manage the extent to which the memory coherency transaction is propagated. For example, field 86 specifies a first coherency domain labeled "zero". A total of M coherency domains are provided. The cache coherency manager 18 handles the debug cache coherency command like other master transactions and present the command to the system interconnect 12 or to the snoop ports of selected caches within a specified coherency domain as required.

Figure 7:
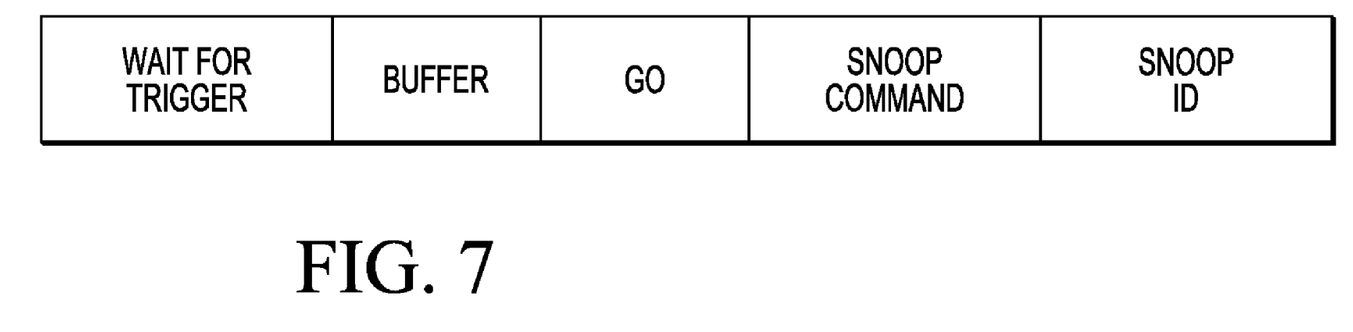
FIG. 7 illustrates in diagrammatic form an example of one of the cache debug control registers of FIG. 5 in accordance with an embodiment of the present invention.

An example of a format of another embodiment of a command within the command field portion of the cache debug control registers 40 is illustrated in FIG. 7. However, it should be understood that in other embodiments additional fields within the cache debug control registers 40 may be implemented and that the physical ordering of the fields is a matter of choice. A first field is a "Wait for Trigger" field and enables one aspect of the trigger control logic 43 functionality. In one form this field is a single bit wherein when the Wait for Trigger bit is a zero there is no waiting for a trigger event and when the Wait for Trigger bit is a one, the control circuitry 41 waits for a trigger event before issuing a debug snoop request with this bit set from the debug request buffer circuitry 45 to control logic 141. A second field is a Buffer field which also may be implemented as a single bit. When the buffer field is a zero value the control circuitry 41 will not wait for a trigger event and will not wait for the "Go" command to be described herein. When the buffer field is written to a one value for a debug snoop command provided by the external debugger 7, the control circuitry 41 will wait for a trigger event or for the "Go" command before allowing the entry in the buffer to cause a debug snoop request to control logic 141 via the snoop control interface. In this embodiment, multiple entries may be buffered in debug request buffer circuitry 45 and held awaiting a Go value of 1 or a trigger event before being provided to control logic 141 for processing by cache coherency manager 18. A third field in the command register is a Go field which also may be implemented as a single bit. When the Go field is written to a zero value, the control circuitry 41 will not allow buffered entries in the debug request buffer circuitry 45 to start requesting the snoop entries to the control logic 141. When the Go field is written to a one value, the control circuitry 41 will allow buffered entries in the debug request buffer circuitry 45 to start requesting the snoops to control logic 141. A fourth field is the snoop command field which contains the specific function of the debug snoop command. As explained above the debug snoop command may implement various functions, such as an invalidate function, a synchronize function or a flush function, for example. A fifth field is the snoop identifier (ID) which is one of the status fields within the snoop queue, and is provided back to the debug response buffer circuitry 47 following processing of each debug snoop request to be stored with the response information for retrieval by external debugger 7. In an alternate embodiment, the debug request buffer circuitry 45 may contain threshold logic to determine how many entries have been buffered internally prior to being sent to the snoop control 54, the buffering occurring as each command is received with the buffer bit written to a "1". After a predetermined number of entries have been buffered and a predetermined queue fullness threshold value is reached, the buffered entries may be triggered to begin processing. The predetermined threshold value or number (i.e. a threshold level) may be a user programmable value provided via a register (not shown) within the cache debug control registers 40, or may be a hardwired value, or a dynamic value determined by other logic within the data processing system 10.

Figure 8:
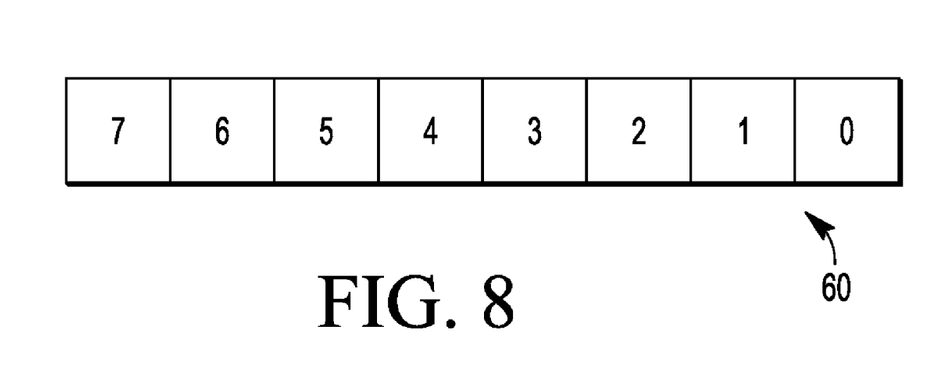
FIG. 8 illustrates in diagrammatic form an example of one of the watchpoint number specifier registers of FIG. 5 in accordance with another embodiment of the present invention.

Illustrated in FIG. 8 is an example of one of various implementations of the watchpoint number specifier registers within the trigger control logic 43 of FIG. 5. The illustrated example represents control for either type of trigger function described above. In the illustrated form the watchpoint number specifier registers has eight fields wherein each field is correlated to a predetermined one of the watchpoints that may be used to condition a debug command trigger action on. Various watchpoints may be used and this programmable register provides a user of data processing system 10 flexibility in programming what trigger events are used to diagnose the performance of the data processing system 10. Watchpoints may correspond to any of a number of predetermined events within portions of the data processing system 10.

Figure 9:
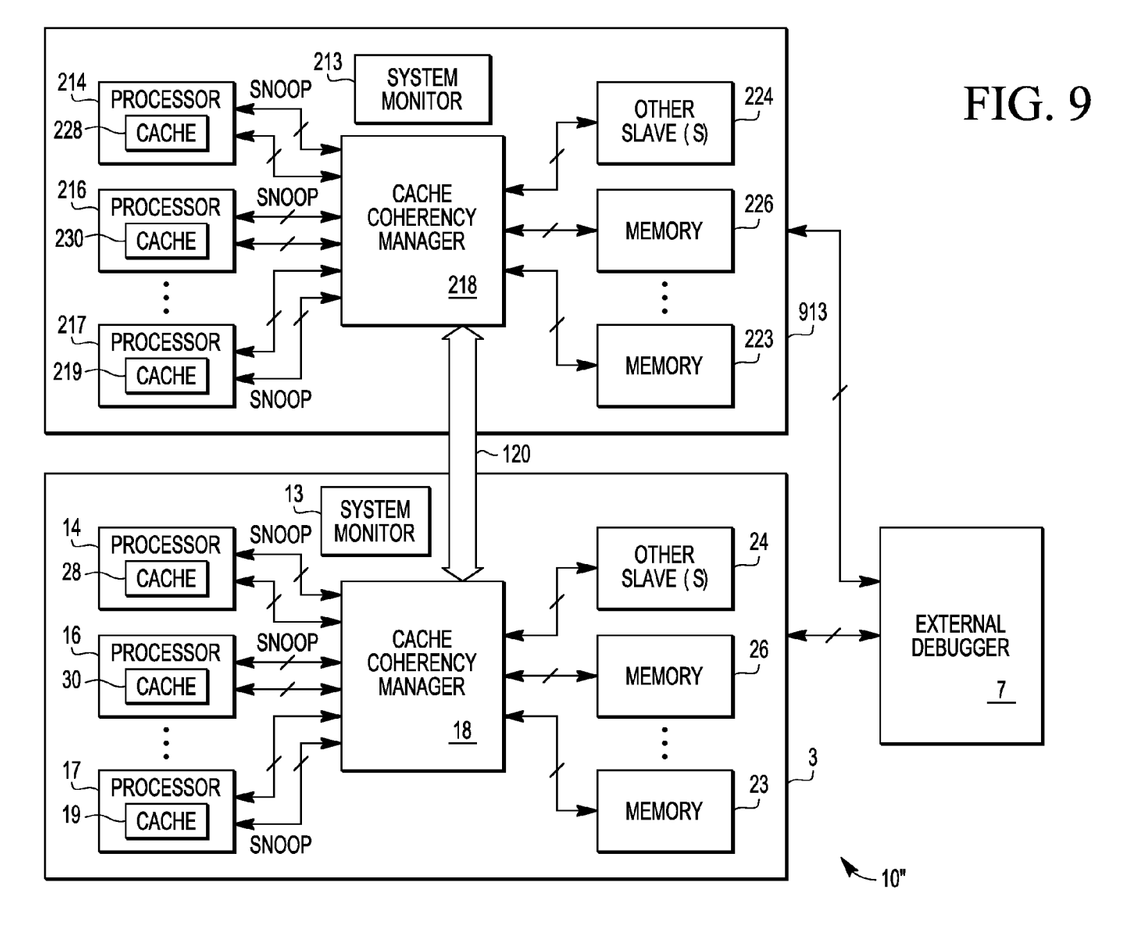
FIG. 9 illustrates in block diagram form multiple interconnected multiple processor systems in accordance with yet another embodiment of the present invention.

Illustrated in FIG. 9 is an exemplary multiple processor system 10" having multiple integrated circuits 3 and 913 that are each coupled to and controlled by the external debugger 7. Integrated circuit 3 is the same as previously illustrated in FIG. 2. A similar integrated circuit 913 contains analogous circuitry as integrated circuit 3. For convenience of illustration the circuitry of integrated circuit 913 is similarly numbered with references having a "two" added to each reference number of integrated circuit 3. The cache coherency manager 18 of integrated circuit 3 is coupled to a cache coherency manager 218 of integrated circuit 213 via a system interconnect 120. In operation, the external debugger 7 is capable of sending a debug cache coherency command to either or both of integrated circuits 3 and 213. Regardless of whether cache coherency manager 18 or cache coherency manager 218 processes the debug cache coherency command, the transaction may be broadcast to any circuit portion of either integrated circuit. In alternate embodiments, integrated circuits 3 and 913 may reside on a single integrated circuit or may be partitioned across multiple integrated circuits in an alternate manner. In operation, communication between the cache coherency manager 18 and cache coherency manager 218 for processing a debug snoop command may occur in an analogous fashion to the communications performed for non-debug snoop commands. Coherency domains or spheres in multiple processor system 10" may be defined to include integrated circuit 3, integrated circuit 913 or both. Each integrated circuit may define additional domains of coherency that include various subsets of processors 14, 16, 17, 214, 216 and 217.

By now it should be apparent that there has been provided a multiple core data processing system that can interact with an external debugger for real time injection of cache snoop transactions into a data processing system. Further, the external debugger can specify control over the distribution of each snoop transaction. A status response is provided to the external debugger after completion of the cache snoop transaction. The data processing system also optionally allows data to be returned to the external debugger after snoop transactions are completed.

Because the apparatus implementing the present invention is, for the most part, composed of electronic components and circuits known to those skilled in the art, circuit details are not explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, the memory may be located on a same integrated circuit as the processors or on a separate integrated circuit or located within another peripheral or slave discretely separate from other elements of system 10. Peripherals and I/O circuitry may also be located on separate integrated circuits or devices. Also system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as the memory or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, the external debugger 7 may be implemented either wholly or partially on a same integrated circuit or same printed circuit board that contains data processing system 10. Various trigger events may be used by the trigger control logic 43, such as breakpoints or other processing exceptions. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data processing system comprising:
 a system interconnect;
 a first interconnect master coupled to the system interconnect, the first interconnect master having a cache;
 a second interconnect master coupled to the system interconnect; and
 a cache coherency manager coupled to the first and second interconnect masters and an external debugger, wherein
  the cache coherency manager provides debug cache coherency operations and non-debug cache coherency operations to the first interconnect master,
  the cache coherency manager generates the debug cache coherency operations in response to debug cache coherency commands from the external debugger and generates the non-debug cache coherency operations in response to transactions performed by the second interconnect master on the system interconnect,
  the cache coherency manager provides second debug cache coherency operations and second non-debug cache coherency operations to the second interconnect master, and
  the cache coherency manager generates the second debug cache coherency operations in response to second debug cache coherency commands from the external debugger and generates the non-debug cache coherency operations in response to transactions performed by the first interconnect master on the system interconnect.

2. The data processing system of claim 1, wherein the debug cache coherency operations are generated in response to the debug cache coherency commands provided via a debug interface from the debugger.

3. The data processing system of claim 1, wherein the debug cache coherency operations are generated in response to the debug cache coherency commands without placing a portion of the data processing system in a halted mode.

4. The data processing system of claim 1, wherein the first interconnect master processes cache coherency operations from the cache coherency manager, the cache coherency operations including both non-debug cache coherency operations and debug cache coherency operations, wherein, in response to processing a cache coherency operation whose corresponding access address hit a cache line in the cache, provides a cache coherency response which includes a previous coherency state of the cache line.

5. The data processing system of claim 4, wherein the previous coherency state of the cache line is provided according to a MESI protocol including an invalid state, an exclusive state, a shared state, and a modified state.

6. The data processing system of claim 4, wherein, in response to processing the cache coherency operation whose corresponding access address hit the cache line in the cache, the previous coherency state of the cache line is selectively transitioned to a new coherency state.

7. The data processing system of claim 1, wherein the second interconnect master comprises a cache, and wherein a first debug cache coherency command of the debug cache coherency commands can identify one or more caches of the data processing system on which to perform a first debug cache coherency operation generated in response to the first debug cache coherency command.

8. The data processing system of claim 1, wherein a first debug cache coherency command of the debug cache coherency commands provides priority information, wherein the cache coherency manager defines a priority for a first debug cache coherency operation generated in response to the first debug cache coherency command based on the priority information.

9. The data processing system of claim 1, further comprising:
    trigger control logic which provides a trigger signal to indicate when a debug cache coherency operation is to be provided from the cache coherency manager to the first interconnect master for processing.

10. In a data processing system having a first interconnect master, a second interconnect master, and a system interconnect coupled to the first interconnect master and the second interconnect master, a method comprising:
    buffering a debug cache coherency operation and at least one additional debug cache coherency operation;
    providing the debug cache coherency operation to the first interconnect master, wherein
    said providing the debug cache coherency operation is performed subsequent to said buffering the debug cache coherency operation and the at least one additional debug cache coherency operation,
    said providing the debug cache coherency operation is performed in response to a number of currently buffered debug cache coherency operations reaching a threshold value, and
    the debug cache coherency operation is generated in response to a debug cache coherency command from a debugger external to the data processing system; and
    providing a non-debug cache coherency operation to the first interconnect master, wherein the non-debug cache coherency operation is generated in response to a snooped transaction performed by the second interconnect master via a system interconnect.

11. The method of claim 10, further comprising:
    processing, by the first interconnect master, the debug cache coherency operation and, in response thereto, providing a debug cache coherency response to the debugger, wherein when an access address corresponding to the debug cache coherency operation hits a cache line in a cache of the first interconnect master, the debug cache coherency response includes a previous coherency state of the cache line.

12. The method of claim 11, wherein the processing the debug cache coherency operation comprises selectively transitioning the previous coherency state of the cache line to a new coherency state.

13. The method of claim 10, further comprising:
    asserting a trigger signal in response to occurrence of a specified debug event, wherein the providing the debug cache coherency operation to the first interconnect master is performed in response to the asserting the trigger signal.

14. The method of claim 10, wherein the debug cache coherency command defines a priority to be assigned to the debug cache coherency operation.

15. The method of claim 10, further comprising:
    providing a debug translation look-aside buffer (TLB) coherency operation to the first interconnect master, wherein the debug cache coherency operation is generated in response to a debug TLB coherency command from a debugger; and
    providing a non-debug TLB coherency operation to the first interconnect master, wherein the non-debug TLB coherency operation is generated in response to a snooped transaction performed by the second interconnect master via the system interconnect.

16. In a data processing system having a plurality of interconnect masters coupled to a system interconnect, each of the plurality of interconnect masters comprising a cache, a method comprising:
    receiving a debug cache coherency command from a debugger external to the data processing system, wherein the debug cache coherency command specifies one or more of the caches of the plurality of interconnect masters and at least one cache coherency domain, and the one or more of the caches are included in the at least one cache coherency domain;
    generating a debug cache coherency operation in response to the debug cache coherency command; and
    providing the debug cache coherency operation to each of one or more of the plurality of interconnect masters whose caches were specified by the debug cache coherency command.

17. The method of claim 16, further comprising:
    providing a non-debug cache coherency operation to at least one of the plurality of interconnect masters, wherein the non-debug cache coherency operation is generated in response to a snooped transaction performed via the system interconnect.

18. The method of claim 16, further comprising:
    receiving a debug cache coherency response from each of the one or more of the plurality of interconnect masters which received the debug cache coherency operation.

* * * * *